(No Model.)

C. A. WARREN.
RUNNING GEAR FOR VEHICLES.

No. 512,775. Patented Jan. 16, 1894.

Witnesses
H. B. Bradshaw
F. S. Gordon

Inventor
Charles A. Warren.
By his Attorneys.
Staley and Shepherd

UNITED STATES PATENT OFFICE.

CHARLES A. WARREN, OF COLUMBUS, OHIO.

RUNNING-GEAR FOR VEHICLES.

SPECIFICATION forming part of Letters Patent No. 512,775, dated January 16, 1894.

Application filed October 31, 1892. Serial No. 450,446. (No model.)

*To all whom it may concern:*

Be it known that I, CHARLES A. WARREN, a citizen of the United States, residing at Columbus, in the county of Franklin and State of Ohio, have invented a certain new and useful Improvement in Vehicle-Gearing, of which the following is a specification.

My invention relates to vehicle gears and has particular relation to the spring gear for carriages.

The objects of my invention are to provide vehicles with a superior and reliable form of gear which will obviate the necessity of employing a reach, which will decrease the draft and which will perform the offices of the full platform or reach gear or both; to so locate the gear parts, fifth-wheel and springs as to obviate the necessity of the greater portion of the gear and springs turning with the axle at the change of direction of the vehicle and to otherwise admit of the independent operation of the axle and springs; to so construct my improved gear as to admit of the direct connection of the shaft with the axle and obviate the use of draw-bars such as are ordinarily employed in reachless gears and to otherwise produce in a neat and compact form, a simple, reliable and inexpensive gear construction for vehicles. These objects I accomplish in the manner illustrated in the accompanying drawings, in which—

Figure 1:
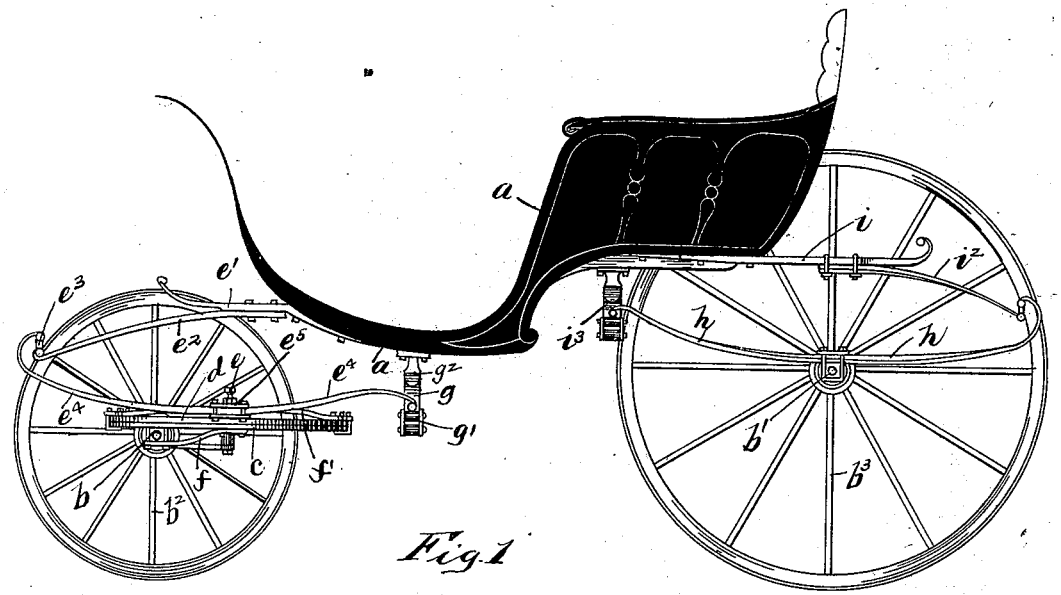
Figure 2:
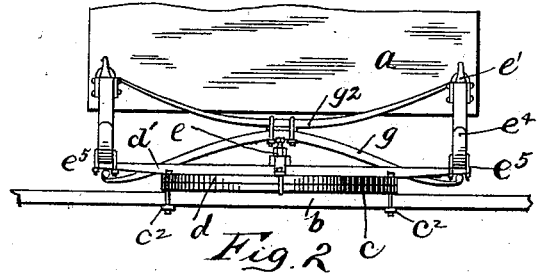
Figure 3:
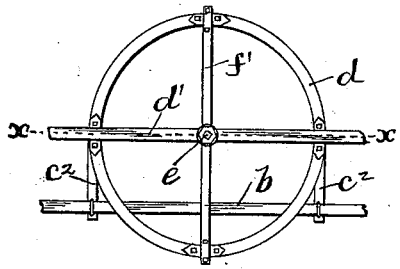
Figure 4:
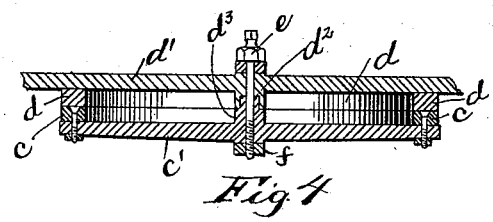

Figure 1 is a side elevation of a vehicle body having my improved gearing thereon. Fig. 2 is a front elevation of said gear with a portion of the body and axle removed. Fig. 3 is a plan view of the fifth wheel showing its connection with the axle, and Fig. 4 is a sectional view on line $x\,x$ of Fig. 3 enlarged therefrom.

Similar letters refer to similar parts throughout the several views.

$a$ represents the body of the carriage which is made of any desirable form, but which is preferably of the phaeton pattern, shown.

$b\,b'$ represent the front and rear axles and $b^2\,b^3$, the front and rear wheels, the forward axle being preferably beneath the forward portion of the vehicle dash.

$c$ represents the lower or stationary ring of the fifth wheel, said ring being supported upon a suitable supporting bar $c'$ which is arranged in rear of the central portion of the axle from which it is supported by means of arms $c^2$ which have their forward ends secured to the under side of the axle and which have their rear ends rigidly secured to the under side of said bar $c'$. The connections of the stationary arms $c^2$ and bar $c'$ are so made that said bar crosses the center of the under side of said ring thus bringing the center of the fifth wheel in rear of the axle, as shown. $d$ represents the rotating circle-bar or upper ring of the fifth wheel which rests upon said ring $c$ in the usual manner. The upper side of the ring $d$ is connected at opposite points with a cross-bar $d'$, the end portions of which project over and beyond the periphery of said ring. This cross-bar $d'$ is provided with a central socket $d^2$ which receives in the ordinary manner the upwardly projecting hub $d^3$ of the lower cross-bar $c'$.

$e$ represents the king-bolt which as shown in the drawings, passes through the centers of the bars $d'$ and $c'$.

$b$ represents a brace which extends from the under side of the bar $c'$ to the under side of the axle to which it is connected and $f'$ is a cross-brace which passes over the under side of the bar $d'$ at right-angles therewith and connects the upper fifth wheel ring $d$ at opposite points.

From the under side of the forward portion of the vehicle body project forwardly on opposite sides thereof suitable bracket arms $e'$, to each of which is bolted or otherwise secured, the rear end of a quarter-elliptical spring-strip $e^2$, the latter extending forwardly and downwardly, as shown. The outer or forward end of each of these springs $e^2$ is connected by a link or shackle $e^3$ with the forward up-turned end of a spring $e^4$, the latter having an elongated S-shape, as shown, and extending rearwardly beneath said spring $e^2$ and beyond the same to a point beneath the vehicle body. Each of these springs $e^4$ has its middle portion secured as shown at $e^5$ upon one end of the cross-bar $d'$.

The rear ends of the springs $e^4$ are connected with opposite ends of a transverse spring $g$ by suitable shackles $g'$. This transverse spring $g$ bows upward beneath the vehicle bed and has its central portions bound to the center of an absolutely bowed upper spring bar $g^2$, the latter having its ends secured to said bed. The above described arrangement of spring gear for the forward portion of a vehicle is different from the rear spring gear only in the fact that the rear springs $h$ which correspond with the forward springs $e^4$ are connected directly with the axle $b'$ instead of a cross-bar, such as the bar $d'$. In this rear spring gear, $i$ represents the spring bracket arms, $i^2$ the spring which corresponds with the forward spring $e^2$ and $i^3$ the transverse spring which corresponds with the spring $g$.

From the construction herein shown and described, it will be seen that a gearing is provided for vehicles wherein the springs are supported above and to a great extent in rear of the forward axle. It will also be seen that by the arrangement of parts above described, a swinging of the forward axle will not in any wise affect the position of the springs.

My construction affords a means of suspending the body directly from the springs and obviates any necessity of employing a reach for the connection of the gears.

It is evident that the compact form of my improved gear and the location of the greater portion of the springs and turn-table in rear of the axle, will admit of the shafts of the vehicle being directly connected with the forward axle, thus obviating the necessity of employing forwardly extended draw-bars or connecting arms for the purpose of forming a connection with the shafts.

In contra-distinction to the above, it is well-known that in the construction of vehicle gears wherein the springs are supported centrally upon the axle and the fifth wheel centrally above said axle, the forwardly projecting springs interfere with the horse to such extent as to require the use of extensions or draw-bars to connect with the heels of the shafts.

It is evident that the comparatively short gear herein shown and described, will lessen both the draft and expense of manufacture and that the arrangement of parts and method of operating the same in my improved gearing will not only provide a simple and effective gear, but will greatly enhance the appearance of the same.

Having now fully described my invention, what I claim, and desire to secure by Letters Patent, is—

1. In a vehicle gear, the combination with the body, wheels and front and rear axles, of the fifth-wheel or turn-table supported from and in rear of the front axle, a cross-bar $d'$ on said fifth-wheel and springs bearing between said cross-bar and vehicle body, substantially as and for the purpose specified.

2. In a vehicle gear, the combination with the body, wheels and front and rear axles, of the fifth wheel supported as described in rear of and from said front axle, a cross-bar $d'$ on said fifth wheel, spring sections $e^4$ supported on opposite sides of said cross-bar and spring sections $e^2$ jointedly connected with said spring sections $e^4$ and rigidly connected with the body, substantially as and for the purpose specified.

3. In a vehicle gear, the combination with the body $a$, the wheels and front and rear axles, arms $c^2$ extending rearwardly from said front axle, a fifth wheel supported on said arms as described, and a cross-bar supported on said fifth wheel, of the jointedly connected spring sections $e^4$, $e^2$ supported respectively from said cross-bar and body and transverse spring $g$ suspended from the under side of said body and jointedly connected with the ends of said spring $e^4$, substantially as and for the purpose specified.

CHARLES A. WARREN.

In presence of—
C. C. SHEPHERD,
ROBERT L. GILHAM.